(12) United States Patent
Clement

(10) Patent No.: US 8,240,761 B2
(45) Date of Patent: Aug. 14, 2012

(54) LOWER ANCHOR COUPLING

(75) Inventor: David Clement, Colorado Springs, CO (US)

(73) Assignee: SKJP Holdings, LLC, Naples, FL (US)

( * ) Notice: Subject to any disclaimer, the term of this patent is extended or adjusted under 35 U.S.C. 154(b) by 391 days.

(21) Appl. No.: 12/565,523

(22) Filed: Sep. 23, 2009

(65) Prior Publication Data
US 2010/0072798 A1    Mar. 25, 2010

Related U.S. Application Data

(60) Provisional application No. 61/099,942, filed on Sep. 25, 2008.

(51) Int. Cl.
*B60N 2/26* (2006.01)
*A47C 31/00* (2006.01)

(52) U.S. Cl. ..................... 297/253; 297/463.1

(58) Field of Classification Search ............... 297/250.1, 297/253, 256.16, 463.1; 292/95, 124, 127, 292/129, 98, 240, 194, 215, 222, 224, 227, 292/229, 197, 333, DIG. 37
See application file for complete search history.

(56) References Cited

U.S. PATENT DOCUMENTS

| | | | |
|---|---|---|---|
| 5,466,044 A | 11/1995 | Barley et al. | |
| 5,690,356 A | 11/1997 | Lane, Jr. | |
| 6,082,819 A | 7/2000 | Jackson | |
| 6,183,044 B1 | 2/2001 | Koyanagi et al. | |
| 6,209,957 B1 | 4/2001 | Baloga et al. | |
| 6,375,260 B1 * | 4/2002 | Hiramatsu et al. | 297/256.16 |
| 6,425,632 B1 | 7/2002 | Anthony et al. | |
| 6,494,535 B2 | 12/2002 | Galbreath | |
| 6,820,310 B2 | 11/2004 | Woodard et al. | |
| 6,827,400 B2 | 12/2004 | Menon et al. | |
| 6,962,394 B2 | 11/2005 | Anthony et al. | |
| 7,246,853 B2 | 7/2007 | Harcourt et al. | |
| 7,278,684 B2 | 10/2007 | Boyle | |
| 2007/0262636 A1 * | 11/2007 | Gastaldi | 297/463.1 |

FOREIGN PATENT DOCUMENTS

| | | |
|---|---|---|
| DE | 19848231 | 8/1999 |
| EP | 0982182 A1 | 8/1999 |
| GB | 2414035 A | 11/2005 |

OTHER PUBLICATIONS

Title: Baby Trend Latch-LOC Infant Seat URL: http://www.pbase.com/carseat/image/3740188.

* cited by examiner

*Primary Examiner* — David Dunn
*Assistant Examiner* — Philip Gabler
(74) *Attorney, Agent, or Firm* — Barlow, Josephs & Holmes, Ltd.

(57) ABSTRACT

The coupling includes a main body with a fixed frame and a locking pawl. A carriage and impact member are connected in spring-biased fashion to the frame. The carriage controls locking of the pawl while the impact member continually urges the pawl in a counterclockwise direction. Pressing the release button causes the carriage to separate from the pawl permitting the impact member to rotate the pawl to permit entry and exit of a LATCH loop into locking communication with the tooth of the pawl. When the button is released, the carriage maintains the pawl open until a LATCH loop is impacted into the back of the pawl to disengage it from the carriage to lock the pawl closed. The invention includes a fail safe measure to maintain locking when any of the springs fail and the ability to accommodate loads much heavier than prior art couplings.

9 Claims, 3 Drawing Sheets

LOWER ANCHOR COUPLING

CROSS-REFERENCE TO RELATED APPLICATIONS

This application is related to and claims priority from earlier filed provisional patent application Ser. No. 61/099,942 filed Sep. 25, 2008, the entire contents thereof is incorporated herein by reference.

BACKGROUND OF THE INVENTION

The present invention relates generally to child restraint and safety devices. More specifically, the present invention relates to child restraint and safety (CRS) devices, such as child car seats and booster seats.

In the prior art, child safety restraints, such as those for use in a vehicle are very well known in the art. Such restraints are secured to an existing vehicle car seat. The child is then secured to the restraint to secure the child during travel. These prior art restraints are typically in the form of a booster seat or a child car seat. A booster seat is commonly known as a seat that attached to an existing vehicle seat where the seat uses the existing belt restraint system of the vehicle. Such a booster seat is commonly used for older children. Also, a child restraint may be in the form of a child car seat which is secured itself directly to the vehicle, such as by the car's seat belt system or directly to the frame of the vehicle using hooks, and other attachment mechanisms and systems.

Many countries around the world have standardized how a child car seat is to be secured to a vehicle seat to improve the overall safety of children's car seats in vehicles. More specifically, a system called Lower Anchors and Tethers for Children (LATCH) includes two lower anchor attachments and a top tether. The term is often used generically to refer only to the pair of fixed lower loop shaped anchors built into the bight or crack between the seat back and seat cushion. FIG. 1 shows such a prior art anchor system 10 with a lower loop 12, typically made of metal, which are specifically designed for children's car seat installation. The loop 12 typically emanates between the vehicle seat back 14 and the seat bottom 16, collectively referred to as the vehicle seat 18. A female seat buckle 15 can also be seen in FIG. 1, which is not used as part of a LATCH interconnection of a child seat (not shown in FIG. 1). When used, existing seatbelts are no longer necessary to connected to a buckle 15 to install the car seat because the child car seat is mounted directly to the vehicle via the metal loops 12 using webbing or a "rigid" connector. For example, the loops 12 extend down and connect directly to the chassis of the vehicle. This construction is so well known in the art that it need not be discussed in further detail herein. Also, one loop 12 is shown in the figures but it should be understood that multiple loops are typically employed in a LATCH or other type of anchorage system.

This makes it easier to install car seats safely, and to make it more universal among car seats and vehicles. Compatible corresponding LATCH coupling systems are now commonly found on child car seat bases, rear-facing, front-facing and combination booster seats and those that have an internal harness.

The LATCH system was originally called ISOFIX, which is a term still used in Europe. Canada, employs a similar standard called the Universal Anchorage System (UAS). It has also been called the Universal Child Safety Seat System or UCSSS. All of foregoing systems refer to the same universal anchorages 12 that started to appear on car models starting in about the year 2000. These are now required by law in the United States for almost all model year 2003 and later vehicles.

As seen in FIG. 2, a child car seat, generally referenced as 19, is secured directly to the loop 12 of a LATCH system by use of webbing 20 included with the child car seat 19. The webbing 20 is routed through the loop 12 of the LATCH system and then tensioned to tightly tether the child car seat 19 to the vehicle car seat 18. One or more LATCH loops 12 can be used to respectively tether one or more points or locations of the child car seat 18 in place. Looped tensioned webbing 20 through a LATCH loop 12 is undesirable because it must be threaded through the LATCH loop 12. As an alternative, rigid interconnects can be used, as will be discussed in detail below.

More preferably, a coupling 40 is employed to releasably interconnect the free webbing attached to the child car seat to the LATCH loop(s) 12. This facilitates and speeds up the installation of a child car seat 19 to the LATCH loops 12. FIGS. 3 and 4 illustrate a lower anchor coupling 40 that is known in the art for this purpose. As can be seen in FIG. 3, the coupling 40 includes a closed loop 42, that defines a aperture 44, such as a slot, to receive the webbing that is attached to the child car seat. Details of such webbing 20 and the tensioning thereof need not be discussed in further detail herein because they are so well known in the art. It should also be understood that the prior art coupling may use a rigid member (not shown) that is affixed directly to a vehicle seat 18 to avoid the use of webbing 20. Similarly, as below, the present invention may also employ a rigid connection member (not shown) rather than a loop and aperture that receives webbing routed from and connected to the child car seat 19.

More specifically, the prior art coupling 40 includes an outer housing 46 with a button 48 that is interconnected to locking pawl 50 in the open side can be disengaged by actuation of the button 48. The locking pawl 50 is spring-biased to a closed position. Preferably, the open side of the coupling 40, with webbing 20 attached to the opposite side thereof, is pressed over the LATCH loop to temporarily open the pawl 50 so that the LATCH loop 12 is captured by the pawl 50. To release the LATCH loop 12 from the locking pawl 50, the button 48 is actuated so the coupling 40 can be disconnected to free the child car seat 19 from the LATCH system of the vehicle.

While the prior art lower anchor coupling is useful in many respects, it suffers from many disadvantages. These couplings were only designed for use with lower weight children, for example, 48 lbs or less. There is a need for coupling that can accommodate higher weight children because there is a trend in car seat design to provide children's car seats for higher weight children.

The primary problem associated with the prior art coupling 40 of FIGS. 3 and 4 is that it is not designed for these increased loads. The actual internal operating mechanism itself is not robust enough to take the loads of a higher weight occupant in a child car seat 19. Also, the design of this prior art coupling 40 suffers from an off-center webbing connector loop 42 which results in uneven/asymmetrical loads to the coupling 40, which reduces the structural integrity of the coupling 40 and the entire child car seat installation. Also, the location and direction of travel of the release button 48 of this prior art coupling 40 is cumbersome and difficult to use. The locking pawl 50 of this prior art device is only a single piece of steel, resulting in a relatively small bearing and support area. This limits the overall strength and integrity of the coupling 40. In summary, the prior art lower anchor coupling 40 of FIGS. 3 and 4 is inadequate for securing child car seats 19 with large loads, such as child car seats with larger children seated therein.

Still further, the prior art coupling 40, as with other prior art couplings, suffers from the disadvantage of disconnecting if any of the springs fail within the device. For example, pawl 50 is spring-biased to a normally closed condition, as seen in FIG. 4. If the spring that retains pawl 50 in this condition fails, the pawl 50 would open thereby permitting the loop 12 of the LATCH system to separate from the child seat 19 creating a safety issue.

Therefore, there is a need for an improved coupling for LATCH systems that can tether webbing, which is attached to a child car seat, to a loop of a LATCH system of a vehicle. There is a need for a coupling that has the strength and integrity to secure child car seats with larger loads therein, such as children that weigh over 48 pounds. There is a further needs for a LATCH coupling that is easy to use, namely, one that is easy to install and disconnect. There is yet a further safety problem that if any of the springs fail in a typical prior art coupling, the entire device will be unable to maintain a safe connection between the child seat 19 and the vehicle seat 18.

SUMMARY OF THE INVENTION

The present invention preserves the advantages of prior art child restraint devices, such as child seats and booster seats and couplings therefor. In addition, it provides new advantages not found in currently available devices and overcomes many disadvantages of such currently available devices.

The invention is directed to a new and novel coupling that has particular use as an anchor for a child seat to secure it to a vehicle. The coupling includes a main body member having an open end capable receiving a lower anchor, attached to a vehicle, therein. A pawl is rotatably connected to the main body member where the pawl includes a tooth that defines an anchor seat region, a lower portion, a rear bearing surface, and a lock seat. The pawl is rotatable between a locked condition where the tooth spans across the open end of the main body member and prevents the lower anchor from being removed from the anchor seat region and an open condition where the lower anchor can freely move in an out of the anchor seat region and be separated from the main body member.

A lower impact member is connected to the main body member and is in spring-biased communication with the lower portion of the pawl thereby urging the pawl to rotate in a first direction to remove the tooth from the open end. A carriage is connected to the main body and is spring-biased into communication with the rear bearing surface of the pawl thereby preventing the pawl from rotating in a second direction, opposite the first direction, to remove the tooth from the anchor seat region via the open end.

A button is connected to the carriage, which is in communication with the lock seat of the pawl when the button is in a released state. The carriage is separated from the lock seat of the pawl when the button is depressed. The lower impact member communicates with the lower portion of the pawl to pivot the pawl into an open condition suitable for receipt of an anchor member into the anchor seat region of the pawl via the open end thereof when the button is depressed. The carriage communicates with the lock seat of the pawl when the button is not depressed.

Also, the button, carriage and pawl are configured so that when after the button is depressed and then released, the carriage communicates with the rear bearing seat of the pawl to maintain it in an open condition until an anchor member is inserted into the open end of the body member and into communication with the pawl to disengage the carriage from the rear bearing seat.

The coupling can accommodate loads that are larger than prior art couplings due to the configuration and size of the locking pawl. Also, the present invention includes a fail safe feature where the coupling will continue to stayed locked onto a LATCH loop even if one or both of the spring-biasing member fail within the device.

It is therefore an object of the present invention to provide a coupling that can connect a child car seat to a vehicle anchor member, such as metal loop of a LATCH system in a vehicle.

It is an object of the present invention to provide a coupling that is easy and safe to operate.

A further object of the present invention is to provide a lower anchor coupling that is less likely to disconnect than prior art couplings.

Another object of the present invention is to provide a lower anchor coupling that will remain locked even if the springs fail within the device.

Yet a further object of the present invention is to provide a lower anchor coupling that can accommodate a load of up to 48 pounds or higher, such as 80 pounds.

Another object of the invention is to provide a coupling with a fail safe feature so that the coupling will continue to lock a child seat to a vehicle's LATCH loop even if the spring-biasing in the device fails.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
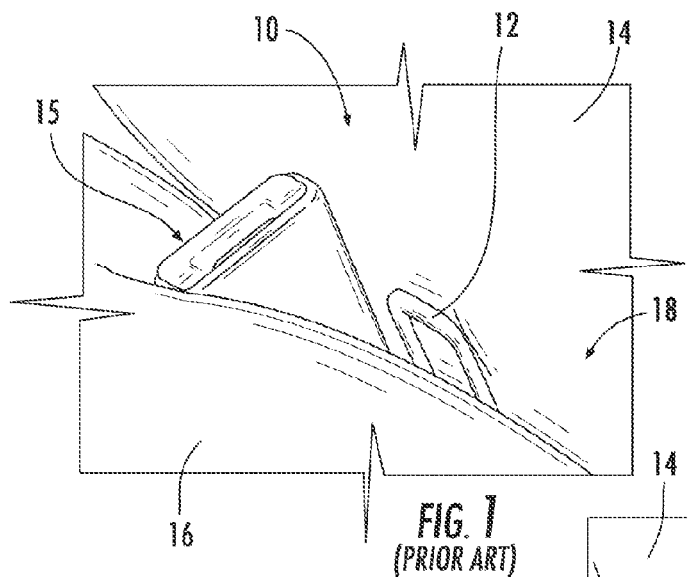
FIG. 1 is a loop of a prior art anchor system for a vehicle for connection of a child seat thereto.
Figure 2:
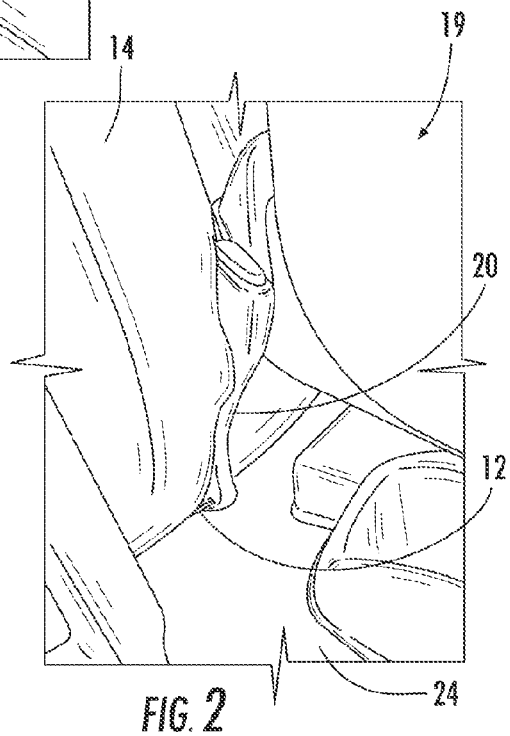
FIG. 2 shows a prior art interconnection of a child seat to the loop of FIG. 1 using webbing material.
Figure 3:
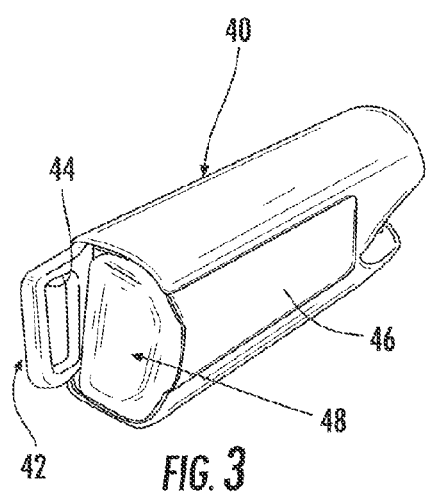
FIG. 3 is a rear perspective view of a prior art lower anchor coupling.
Figure 4:
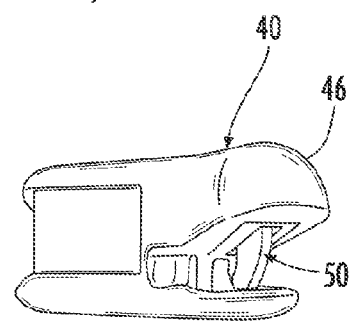
FIG. 4 is a front perspective view of a prior art lower anchor coupling.
Figure 5:
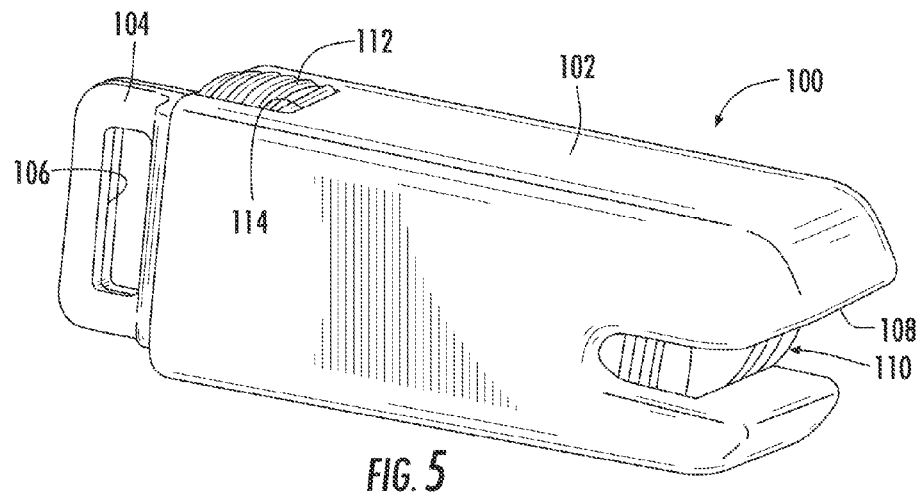
FIG. 5 is a front perspective view of a lower anchor coupling in accordance with the present invention in a locked condition.
Figure 6:
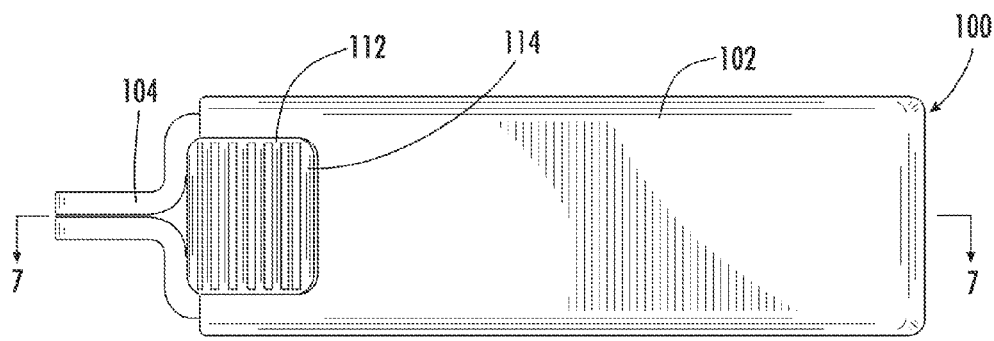
FIG. 6 is a top view of the lower anchor coupling of FIG. 5.
Figure 7:
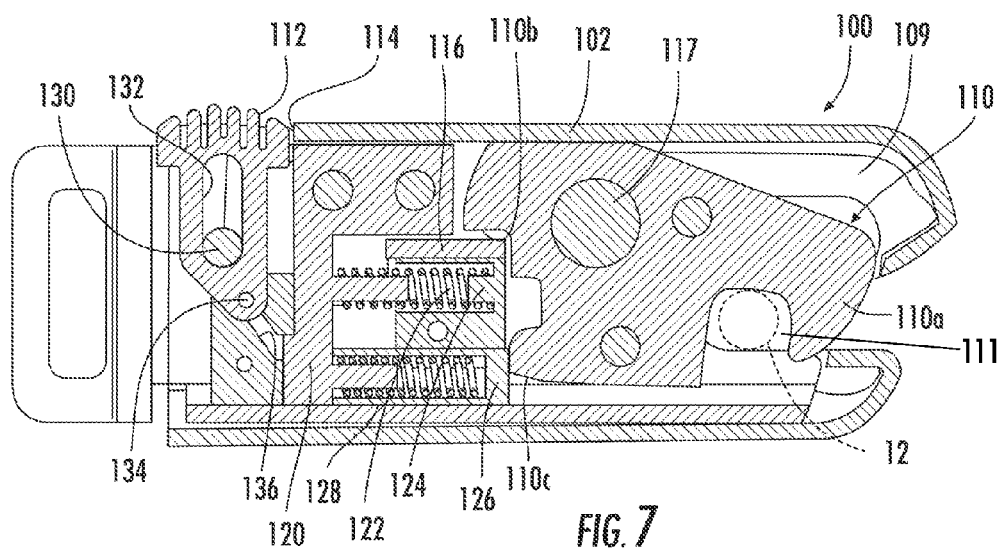
FIG. 7 is a cross-sectional view through the line 7-7 of FIG. 6.
Figure 8:
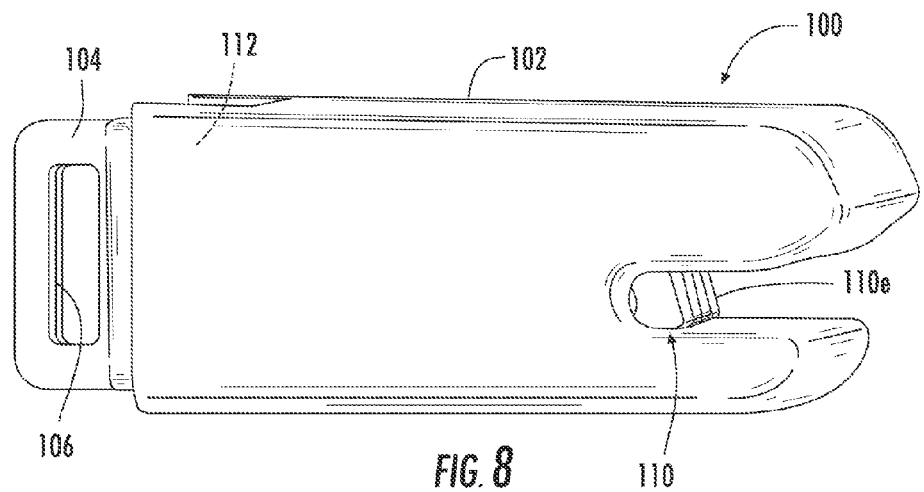
FIG. 8 is a front perspective view of the lower anchor coupling of the present invention in an open condition.
Figure 9:
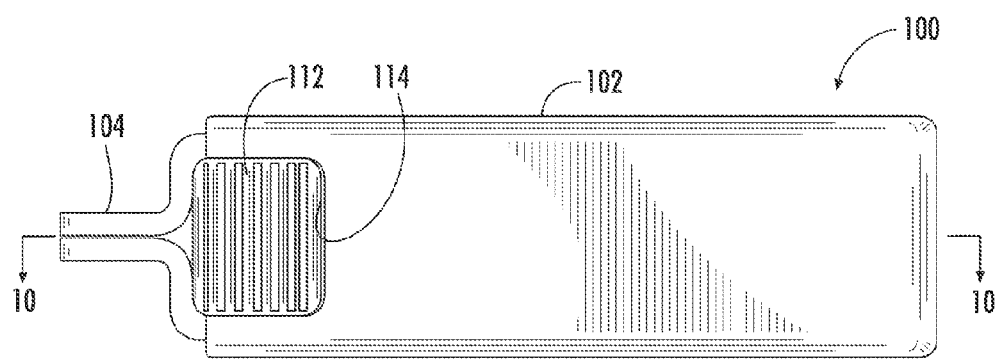
FIG. 9 is a top view of the lower anchor coupling of FIG. 8.
Figure 10:
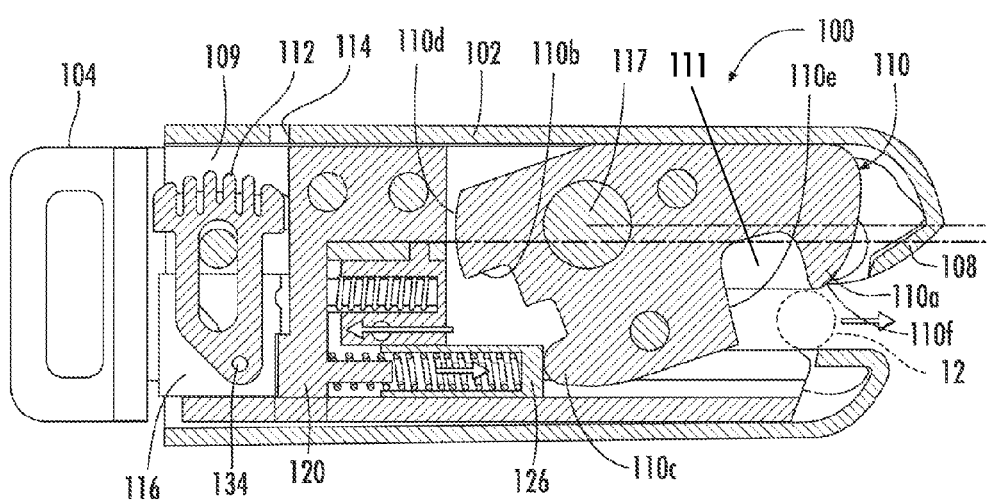
FIG. 10 is a cross-sectional view through the line 10-10 of FIG. 9.

The present invention provides a new and novel coupling 100 for interconnecting a child car seat 19, as seen in FIG. 2, to a loop 12 of a vehicle's LATCH system, as seen in FIGS. 1 and 2, through a vehicle seat 18. FIGS. 5-7 show the coupling 100 of the present invention in a closed condition while FIGS. 8-10 show the coupling 100 in an open condition.

Turning First to FIGS. 5-7, FIG. 5 shows a perspective view of the coupling 100 in the closed condition. This lower anchor coupling 100 is used to secure the child restraint (CRS) to the vehicle via two 6 mm diameter bars/loops 12, as in FIGS. 1 and 2, which are required by federal law to be located in the bite of the vehicle seat 18. Typically, the coupling 100 is used in pairs to respectively couple two portions of the seat 19 to the two bars/loops 12 of the LATCH system. The present invention easily attaches to a given bar/loop 12 of the LATCH system in a vehicle seat 18.

Since webbing 20 and tightening components are so well known in art, they need not be discussed in detail herein. Also, coupling 100 of the present invention may also employ a rigid connection member (not shown) rather than webbing routed from the child car seat 19 to the loop 12. Or, for example, the coupling 100 may be integrated directly into a child car seat 19. Thus, the coupling 100 of the present invention may be easily modified to accommodate this interconnection method and still be within the scope of the present invention.

Turning now to details of the construction of the coupling 100 of the present invention. The coupling includes a main body 102 with a loop of material 104 with a slot 106, such as one that is D-shaped, at one end to receive the appropriate webbing that is attached to the seat. The loop of material 104 may be an extension of or integrated into a backing plate 109 that resides in the main body 102.

As can be seen in FIG. 6, the loop of material 104 with slot 106 is located on the longitudinal centerline of the main body 102 to provide a well balanced connection. The opposing end of the main body includes a opening 108 that includes a locking pawl, generally referred to as 110, which is preferably multiple pawl members stacked side by side, as seen in FIG. 5, or one wide pawl member 110 to increase strength and integrity of the locking and to accommodate heavier loads, such as children over 48 pounds. Such a strong pawl 110 enables the coupling 100 of the present invention to accommodate loads up to 80 pounds or more. FIG. 6 shows a top view of the coupling to illustrate that the loop of material 104 and slot 106, such a one that is D-shaped, is symmetrically oriented transversely across the width of the coupling 100. Also, the button 112 is accessed on the top of coupling 100 through an aperture 114 in the main body 102. As a result, the coupling 100 is easier to use and more well balanced than prior art devices.

FIG. 7 shows a cross-section of the coupling 100 in a locked condition. A locking pawl 110 pivots about a pivot point. Multiple pawl plates can be secured together to provide one large and thick pawl member 110. A sliding carriage 116 is spring-biased to the right to sit underneath a back seat notch 110b of the pawl 110. A frame 120 is fixed to the main body 102 preferably via the backing plate 109. One or more springs 122 (one seen in FIG. 7) spring-biases of the sliding carriage 116 to the right due to the engagement of the spring 122 on post 124 on the carriage 116 and post 126 on the frame 120. Other constructions may be employed for spring-biasing the carriage 116.

Pawl 100 is rotatably connected to the main body 102 via pin or axle 117. The spring-biased carriage 116 to the right prevents the pawl 110 from rotating counterclockwise about pivot pin 117 to permit the LATCH loop 12 to release from the tooth 110a of the pawl 110 thereby permitting the child car seat 19 to separate from the LATCH system 12. As in FIGS. 7 and 10, the pawl 100 is rotatably connected to the main body 102 where the pawl 100 includes the tooth 110a that defines an anchor seat region 111.

A lower impact member 126 is also provided which is independently spring-biased to the right toward the lower portion 110c of the pawl 110. One or more springs 128, preferably two, are used for the spring-biasing of the lower impact member 126. A fixed pin 130 slidably resides in slot 132 of release button 112 for alignment thereof. The free lower end of the button 112 includes a pin 134 that slidably resides in slot 136 in the rear portion of the sliding carriage 116. The locking condition, shown in FIG. 7, the locking pawl 110 is prevented from rotating in a counterclockwise direction thereby securely capturing the LATCH loop 12 behind the tooth 110a of the pawl 110.

To separate a child car seat 19 from a LATCH system loop 12 in a vehicle seat 18, the coupling 100 must be opened to release the LATCH loop 12 from the embrace of the locking pawl 110. FIG. 8 shows a perspective view of the coupling 100 of the present invention in this open condition. As can be seen, the release button 112 is not clearly seen in FIG. 8. because it has been depressed to actuate the locking pawl 110 open, as will be described in detail below. The release button 112 can, however, still be clearly seen in top view FIG. 9 and in the cross-sectional view of FIG. 10.

FIG. 10 shows a cross-sectional view of the coupling 100 in an open condition. The release button 112 is depressed to urge the sliding carriage 116 rearwardly because the pin 134 of the button 112 slides in the angled slot 136 of the sliding carriage 116. As a result, the sliding carriage 116 is no longer residing underneath the back seat notch 110b of the locking pawl 110 permitting it to freely rotate, namely, in the counterclockwise direction. The spring-biased lower impact member 126 continues to push to the right into the lower portion 110c of the pawl 110 to urge the pawl 110 to rotate in a counterclockwise direction about axle 117. However, since the sliding carriage 116 is no longer residing underneath the back seat notch 110b of the pawl 110, the impact member 126 will impact the lower portion 110c of the pawl to cause it to rotate in a counterclockwise direction. As a result, the tooth 110a of the pawl 110 moves upwardly thereby permitting the loop 12 of the LATCH system to be easily removed from the opening 108 in the main body 102 of the coupling 100. Since the impact member 126 is positioned below the centerline of the locking pawl 110, a relatively small amount of force is required to keep the pawl 110 disengaged.

When the release button 112 is disengaged, the locking pawl 110 will stay open because the impact member 126 will continue to push on the lower portion 110c of the pawl 110 and the sliding carriage 116 will bear against the rear surface 110d of the locking pawl 110. When the coupling of the present invention is desired to be installed, the opening 108 of the coupling 100 is routed over a LATCH loop 12 which will impact the back wall 110e of the pawl 100 thereby causing the pawl 100 to rotate clockwise and against the forces of the spring-biased impact member 126. As a result, the rear surface 110d of the pawl 110 disengages with the sliding carriage 116. Further clockwise rotation of the pawl 110 enables the sliding carriage 116 to be urged to the right and back underneath back seat notch 110b at the rear of the pawl 110. The release button 112 will then return to its upward position and the pawl 110 will be again in a locked condition, as per above.

Also, if the locking pawl 110 is closed and the installation on a LATCH loop is desired, the button can be depressed to open up the pawl 110. Or, with the locking pawl 110 still closed, the coupling 100 can be directly pressed on loop 12 of the LATCH system so that the loop 12 engages with the arcuate leading edge 110f of the pawl 110 to urge the pawl 110 upwardly. When the loop 12 clears past the tooth 110a of the pawl 110, the pawl 100 will remain open. As per above, further urging of the loop 12 into the coupling and into engagement of the notch 110e of the pawl 110 causes the desired counterclockwise movement of the pawl 110 and resultant locking.

The foregoing coupling configuration of the present invention provides a fail safe interconnection that is not possible in the prior art. If any of the springs 122, 128 fail, the pawl 110 will remain locked. For example, if spring 122 fails, the spring-biasing of the impact member 126 by spring 128 would continue to urge the pawl 110 counter clockwise which results in continued downward pressure onto the carriage 116. On the other hand, if the lower spring 128 fails, the spring-biasing of the carriage 116 by upper spring 122 would still prevent counterclockwise rotation of pawl 110, thereby preventing the pawl 110 from opening. As a result, the carriage 116 would remain underneath the pawl 110 thereby maintaining a locked condition.

It should be noted that the coupling 100 of the present invention can be made of any suitable materials. For example, the entire device 100 may be made from metal, such as steel. The main body 102 may be made of plastic, for example, or other material.

In view of the foregoing, a new and novel coupling 100 is provided for use in child car seats 19 and vehicle seat 18 that use a LATCH or similar standardized anchor system that uses a fixed loop 12 of material The coupling 100 of the present invention is stronger, easier to use, has more integrity and can accommodate larger loads than prior art couplings.

It would be appreciated by those skilled in the art that various changes and modifications can be made to the illustrated embodiments without departing from the spirit of the present invention.

What is claimed is:

1. A coupling for securing a child seat to lower anchor member of a vehicle, comprising:
   a main body member having an open end capable receiving a lower anchor, attached to a vehicle, therein;
   a pawl rotatably connected to the main body member; the pawl including a tooth defining an anchor seat region, a lower portion, a rear bearing seat, and a back seat notch; the pawl being rotatable between a locked condition where the tooth spans across the open end of the main body member and prevents the lower anchor from being removed from the anchor seat region and an open condition where the lower anchor can freely move in and out of the anchor seat region and be separated from the main body member;
   a lower impact member connected to the main body member and being linearly spring-biased into communication with the lower portion of the pawl thereby urging the pawl to rotate in a first direction to remove the tooth from the open end;
   a carriage connected to the main body and being spring-biased into communication with the rear bearing seat of the pawl thereby preventing the pawl from rotating in a second direction, opposite the first direction, to remove the tooth from the anchor seat region via the open end; and
   a button connected to the carriage and having a direction of travel; the carriage being in communication with the back seat notch of the pawl when the button is not depressed; the carriage being separated from the back seat notch of the pawl when the button is depressed; the lower impact member communicating with the lower portion of the pawl, in a direction perpendicular to the direction of travel of the button, to pivot the pawl into an open condition suitable for receipt of an anchor member into the anchor seat region of the pawl via the open end thereof when the button is depressed and the carriage communicates with the back seat notch of the pawl when the button is not depressed.

2. The coupling of claim 1, wherein the button, carriage and pawl are configured so that when after the button is depressed and then released, the carriage communicates with the rear bearing seat of the pawl to maintain it in an open condition until an anchor member is inserted into the open end of the body member and into communication with the pawl to disengage the carriage from the rear bearing seat.

3. The coupling of claim 1, further comprising:
   means for connecting a child car seat to the main body.

4. The coupling of claim 3, wherein the means for connecting a child car seat to the main body is a loop, defining a slot, on the main body and webbing material connected to the loop via the slot to the child car seat.

5. The coupling of claim 3, wherein the means for connecting is located on a rear portion of the main body member and on a longitudinal centerline of the main body.

6. The coupling of claim 1, further comprising:
   a frame mounted to the main body member; the lower impact member being connected to the frame in spring-biased communication; the carriage being connected to the frame in spring-biased communication.

7. The coupling of claim 6, wherein the lower impact member is spring-biased relative to the frame with a first coil spring and the carriage is spring-biased relative to the frame with a second coil spring.

8. The coupling of claim 1, wherein the lower anchor is a LATCH system.

9. The coupling of claim 1, wherein the pawl includes a plurality of plates for added strength so the coupling can accommodate heavier loads.

* * * * *